United States Patent
Siala

(10) Patent No.: US 6,990,092 B1
(45) Date of Patent: Jan. 24, 2006

(54) ITERATIVE PROCESS FOR TDMA RADIOMOBILE COMMUNICATIONS

(75) Inventor: Mohamed Siala, Clamart (FR)

(73) Assignee: France Telecom, Paris (FR)

( * ) Notice: Subject to any disclaimer, the term of this patent is extended or adjusted under 35 U.S.C. 154(b) by 1091 days.

(21) Appl. No.: 09/585,352

(22) Filed: Jun. 2, 2000

(30) Foreign Application Priority Data

Jun. 2, 1999 (FR) ................................. 99 06945

(51) Int. Cl.
*H04B 7/212* (2006.01)
*H04Q 7/28* (2006.01)

(52) U.S. Cl. .................. 370/347; 370/340; 370/342

(58) Field of Classification Search ............. 370/321, 370/335–336, 338, 341, 342, 347–348
See application file for complete search history.

(56) References Cited

U.S. PATENT DOCUMENTS 6,263,029 B1 * 7/2001 Alard et al. ............... 375/340

6,424,644 B1 * 7/2002 Siala et al. ................. 370/342

FOREIGN PATENT DOCUMENTS

EP 0802656 * 10/1997

OTHER PUBLICATIONS

"Iterative Rake Receiver With Map Channel Estimation for DS-CDMA Systems", Mohammed Siala et al. 1999 ,pp 243-254.*

Mohamed Siala, et al., Ann. Télécommun., vol. 54, No. 3/04, pp. 243-254, "Iterative Rake Receiver With Map Channel Estimations for DS-CDMA Systems", 1999.

Yue Chen, et al., IEEE Journal on Selected Areas in Communications, vol. 16, No. 9, pp. 1679-1690, "Soft-Output Equalization and TCM for Wireless Personal Communication Systems", Dec. 1998.

* cited by examiner

*Primary Examiner*—Afsar Qureshi
(74) *Attorney, Agent, or Firm*—Oblon, Spivak, McClelland, Maier & Neustadt, P.C.

(57) ABSTRACT

An iterative process for TDMA radiomobile communications where several reference sequences are distributed in each allocated timeslot. On reception, a multipath channel mesh representation and an iterative process are used.

8 Claims, 6 Drawing Sheets

ITERATIVE PROCESS FOR TDMA RADIOMOBILE COMMUNICATIONS

BACKGROUND OF INVENTION

1. Technical Field

The purpose of this invention is an iterative process for TDMA (Time Division Multiple Access) radiomobile communications.

It may be applied to the European GSM radiomobile system [1] and its development to GSM++ or to the American D-AMPS system.

2. State of Prior Art

TDMA systems can be used to distribute several users communicating through the same radioelectric channel, in time [1, 3]. Each user is separated from the others by periodically assigning a timeslot to him in which he can transmit, and another timeslot in which he can receive. Protective intervals are allowed at each end of each timeslot in order to guard against imperfections in time synchronization between transmitters and interference between consecutive timeslots resulting from the plurality of pathways.

FIG. 1 attached thus shows timeslots $TA_1, TA_2, \ldots, TA_N$ allocated to N users with protective intervals IG.

The radioelectric signal transmitted during a timeslot is obtained by transposition of the equivalent base band signal into frequency. The base band signal is the result of filtering the data stream to be transmitted through a "transmission" filter. Normally, the transmitted data stream is composed of two sequences of data symbols separated in time by a sequence of symbols known to the receiver, called the reference sequence. The two sequences of data symbols may possibly originate from coding and interlacing of information to be transmitted.

The reference sequence frequently has good time correlation properties, in order to enable a precise estimate of the channel at the receiver. For example, the reference sequences used in the GSM system, called CAZAC (Constant Amplitude—Zero AutoCorrelation) sequences [1, 4, 5] are sequences with components taken from the bipolar alphabet $\{-1, 1\}$ and possessing a null circular autocorrelation function everywhere except at the origin.

The radiomobile channel used during a communication between a transmitter and a receiver is usually of the multipath type with fast fading called RAYLEIGH fading. The existence of several paths is due to the fact that the radioelectric wave is propagated along several paths between the transmission location and the reception location.

The received signal is then the sum of several more or less delayed replicas, more or less modified in phase and in amplitude. In order to obtain a reliable reproduction of the information carried by these replicas, the receiver applies filtering matched to the transmission filter and to the channel and it combines energy contributions from all transmitted signal replicas in an optimum manner. The output signal from the matched filter is sampled at the rate of the symbols and it is whitened using a discrete filter called a whitener.

Samples at the output from the whitener filter supply a filtered and noisy version of the transmitted data stream. The discrete filter associated with this filtered version, also called the discrete channel, has a finite pulse response that varies from one sample to the other. It characterizes the production of the multipath channel during the corresponding reception timeslot, in an indirect manner.

Samples at the output from the whitener filter corresponding to the reference sequence are used to estimate the discrete channel [1, 4, 5]. This estimate of the discrete channel is used to equalize the remaining samples, so that the two transmitted data sequences can be detected if there are any. The equalizer usually used is known as the VITERBI equalizer with flexible decisions [2]. As its name suggests, this equalizer uses an application of the Soft-Output Viterbi Algorithm (SOVA) [2] to produce soft decisions on all transmitted data symbols. These soft outputs are possibly de-interlaced and decoded to detect the information transmitted.

FIG. 2 attached shows these transmission/reception operations. The transmitter E comprises a data source 10, an encoder/interlacer 12 outputting symbols $a_k$, and a modulator 14. The multipath channel is symbolized by a block 20. The receiver R comprises a demodulator 30 (matched filter/whitener filter) outputting samples $R_k$, a discrete channel estimator 32, an equalizer 34, a de-interlacer/decoder 36 and finally an addressee 38.

The discrete channel seen at the output from the whitener filter may vary significantly from one timeslot to the next. This variation is due mainly to the change in propagation conditions between the transmitter and the receiver and to the frequency stability at the receiver.

Propagation conditions have a direct influence on the observed multipath channel. They change due to a modification in the environment or a displacement of the transmitter and/or the receiver. They create a time variation in the discrete channel, both between successive timeslots and within the same timeslot.

The variation of the discrete channel between two successive timeslots allocated to the same user is particularly large when the time interval between these timeslots is large. This variation is accentuated, even at a single timeslot, due to an increase in the carrier frequency or the speed of the transmitter and/or the receiver.

In practice, the variation of the discrete channel between two timeslots is sufficiently large to prevent any modulated estimate of the channel. The estimate of the channel in a timeslot must then be based solely on the samples of the corresponding reference sequence.

The use of this reference sequence provides an unbiased estimate of the discrete channel at the mid-point of the timeslot. Like the GSM system, an invariable channel is usually assumed within a received timeslot. In this precise case, the estimate obtained at the mid-point of the frame can be used without degradation for equalization of the rest of the frame. But high speed movements of some terminals and the sustained demand for higher rate services operating at increasingly high radioelectric frequencies, make this assumption less and less justified. The discrete channel may be affected by significant variations between the beginning and the end of a given timeslot. The difference between this real discrete channel and its estimate becomes increasingly large as the distance from the reference sequence increases. This may cause a large and irreversible deterioration in the reception quality and/or performances of the TDMA system.

One solution [13] has already been proposed to solve this problem of fast variation of the channel in the case of radioelectric channels related to satellite radiocommunications. However, this solution only deals with the case of one channel with a single path and assumes that reference or data symbols have a common transmitted energy. Therefore, it cannot be applied to multipath channels encountered in land radiomobile communications.

Furthermore, like the EDGE extension in the GSM system, high rates may be obtained with unchanged frequency band by the use of modulations using an increasing number of states. The system then becomes very sensitive to the channel estimating quality, and severe deterioration may occur even at very low displacement speeds if the power and/or length of the reference sequence are not increased.

The purpose of this invention is to overcome these disadvantages.

SUMMARY OF THE INVENTION

The purpose of this invention is to improve the performances of TDMA systems by reducing the ratio between the received power and the multiple access interference for a given reception quality, or in other terms, to improve the reception quality for a constant reception power. This improvement in quality makes it possible to increase the capacity and coverage of TDMA systems such as GSM system, and particularly its EDGE extension to offer high rate services. In particular, this improvement is obtained due to an optimization of the channel estimate at the receiver. This optimization is a means of overcoming any deterioration in the performances generated by a fast variation in the channel between the beginning and the end of the same timeslot. It can also significantly reduce deterioration caused by an increase in the number of modulation states, without increasing the length or power of the reference sequence.

Another purpose of this invention is to reduce the cost price of terminals by making them less sensitive to the poor frequency stability of an inexpensive local oscillator (for the same reception quality), for example such that the received signal can be transposed into base band.

The invention can also reduce the number and/or power of reference symbols transmitted during each timeslot, for the same reception quality. This purpose is achieved by taking account of data symbols in the discrete channel estimate that are usually more numerous than the reference symbols. This purpose is also achieved by the optimum usage of samples corresponding to the reference symbols and/or data symbols of an arbitrary number of timeslots allocated to the user. This usage is achieved even in the case of large variations in the channel between two successive timeslots belonging to the same user. Finally, this purpose is achieved by the optimum usage of samples from the common signal channel, and possibly users on the down link.

According to the invention, the reference symbols are distributed into groups throughout the duration of the allocated timeslot, which guarantees better tracking of the channel variation and therefore increased robustness with regard to high displacement speeds and poor frequency stability of the local oscillator. Reference sequences may be chosen independently of each other, but they must always have good autocorrelation properties. They may be derived from short CAZAC type sequences.

With the invention, the energy transmitted per symbol may vary from one symbol to another, without causing difficulties for the channel estimate which is always done optimally.

According to the invention, a timeslot is processed by block every time that the samples corresponding to this timeslot and possibly to other timeslots (originating from the same user, from other users or from the common signal channel) are available to make the channel estimate.

Like a conventional TDMA receiver (such as the GSM system receiver), the first step is always a coarse estimate of the discrete channel using samples depending only on reference symbols only in the timeslot to be processed. This coarse estimate characterizes the phase and amplitude variation of all coefficients (improperly called "paths") in the discrete channel selected for carrying out the equalization, for each reference or data symbol in the block to be processed, and symbol by symbol.

One of the characteristics of the invention is the use of a mesh to represent the multipath channel. This characteristic reduces the complexity of the receiver. If we consider the example of sequences of data symbols comprising n symbols without coding, with a two-state phase modulation (MDP2), each transmitted bit may be equal to either of two values. Since these two values are equally probable, this means that there are $2^n$ possible sequences of data symbols. Therefore the complexity of a traditional calculation using partial probabilities for all possible sequences increases exponentially ($2^n$) with the number of symbols per sequence.

The use of a mesh according to the invention to represent the channel considerably reduces the complexity of the calculations, since the calculations will be sub-divided into sections, each section requiring a certain calculation type, always the same for each section. Therefore, the complexity increases with the number of sections, which increases in proportion to the number n. Therefore the complexity is linear, rather than exponential.

The labels of the branches of mesh sections change with the variation of the discrete channel with time in each of the timeslots forming the block. Furthermore, an algorithm other than the Soft-Output Viterbi Algorithm (SOVA) [2] is used for a more precise characterization of the probabilities of the branches of the mesh dependent on the samples received. If the channel estimator is used optimally, these conditional probabilities may be determined using a BAHL or BCJR (abbreviation for Bahl Coke Jelinek Raviv) algorithm [6]. Other simpler algorithms [10], usually derived from linearization of this algorithm, may also be used, however performances will be slightly reduced. They can considerably reduce the complexity of the channel estimator.

In the case of a conventional receiver, the only weighted outputs provided by the SOVA algorithm are used directly after de-interlacing to decode the transmitted information. In the case of the receiver according to the invention, the conditional probabilities indirectly characterizing the data symbols are used in addition to the reference symbols to provide a better quality estimate of the discrete channel.

The improved estimate of the discrete channel obtained at the end of a given iteration may be used to improve the quality and reliability of conditional probabilities of branches of the mesh characterizing the discrete channel. These improved conditional probabilities may then be used jointly with the reference symbols to provide an additional improvement to the estimate of the discrete channel.

In theory, an iterative estimate will not give an optimum estimate of the discrete channel until after an infinite number of iterations has been carried out. However in practice, a few iterations are sufficient to obtain performances that are almost as good as an optimum estimate.

Once the discrete channel estimate has been made, the corresponding mesh may be used either by the BAHL optimal algorithm (or by any simplification of it), or by the SOVA algorithm to provide improved weighted outputs to the decoder.

The optimum nature of the receiver according to the invention is related to the quality of the discrete channel estimate seen during a given timeslot. This optimum nature is based on the use of an iterative algorithm called the SAGE (Space-Alternating Generalized Expectation-Maximization Algorithm) [7] to find the most probable channel set up according to samples received from the block to be processed. The SAGE algorithm is an extension of the EM (Expectation-Maximization) [8, 9] algorithm, that eliminates the problem of coupling between coefficients of the discrete channel while they are being estimated.

The estimate of the discrete channel is also based on the decomposition of each discrete channel path to be estimated according to a KARHUNEN-LOEVE [3] expansion algorithm. This decomposition provides firstly a soft characterization of the variations with time of each of the discrete paths, and secondly is naturally integrated into the SAGE algorithm. It can also process cases in which the energy transmitted per symbol varies from one symbol to another.

Finally, the discrete channel estimate is based on the use of the BAHL algorithm which provides the probabilities of the mesh branches characterizing the discrete channel to each iteration of the SAGE algorithm, according to received samples and the channel estimate supplied in the previous iteration.

Therefore more precisely, the purpose of the invention is a radiomobile communication process of the time division multiple access type, in which timeslots are allocated to several users for transmission and reception of radioelectric signals, and in which:

on transmission, data symbols and reference symbols are created in each allocated timeslot, a radioelectric signal containing these data symbols and reference symbols is transmitted, this signal being sent along a multi-path radiomobile channel, on reception, matched filtering is applied to the received signal, the filtered signal is sampled at the rate of the symbols, an estimate of the radiomobile channel is made, the samples are processed using this channel estimate and data symbols specific to the allocated timeslot are restored, this process being characterized in that:

on transmission, several reference sequences possessing appropriate time correlation properties are built up for each allocated timeslot, and these sequences are distributed in each timeslot, on reception:
  i) in order to estimate the radiomobile channel, this channel is represented by a mesh comprising branches symbolizing transitions between two successive states of the channel and characterizing possible sequences at the channel output,
  ii) the probabilities of these branches are calculated using an iterative algorithm in which an estimate of a representation $\{G^{1(D)}\}_{l=0}^{L-1}$ of L paths of this channel is calculated using a finite number (D+1) of iterations using the maximum a posteriori probability criterion, the iteration rank (d+1) (3d+1) being used to obtain a re-estimate $\{G^{1(d+1)}\}_{l=0}^{L-1}$ starting from the estimate $\{G^{1(d)}\}_{l=0}^{L-1}$ obtained in the previous iteration (3d), and in each iteration (3d+1), the vectors $\{G^{1(d+1)}\}$ l=0, 1, . . . , L−1 are calculated in L steps from vectors $\{G^{m(d+1)}\}_{m=0}^{l-1}$ and $\{G^{m(d)}\}_{m=1}^{L-1}$ calculated in the previous step, the estimate $\{C^{1(D)}\}_{l=0}^{L-1}$ of L channel paths finally being obtained from the estimate of its representation $\{G^{1(D)}\}_{l=0}^{L-1}$.

DESCRIPTION OF PARTICULAR EMBODIMENTS

The performances of the process according to the invention have been compared with the performances of a variant of the conventional process used for the GMS system [1]. A conventional receiver in the GSM system starts by estimating the discrete channel at the mid-point of the timeslot to be processed by correlation of received samples that depend solely on the reference sequence with the corresponding CAZAC sequence. It then equalizes the other received samples using the SOVA algorithm in order to decode the transmitted information symbols. The SOVA sub-optimal algorithm was replaced by the BAHL optimal algorithm used in the invention, in order to equitably evaluate the intrinsic improvement in performances provided by the invention compared with a conventional GSM receiver.

The comparison is made using the variation in the unmodified bit error rate (BER) (without considering any error correction or detection coding), for reference symbols grouped at the mid-point of the timeslot to be processed (like the GSM system), and distributed in small groups throughout the duration of this timeslot (according to the invention) in order to give better tracking of the variation of the channel with time.

Figure 3:
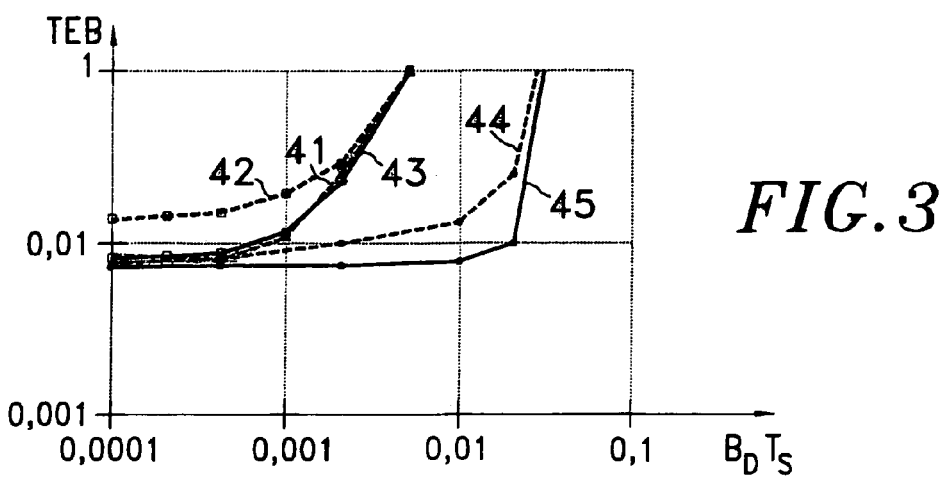
FIG. 3 shows variations of the bit error rate (BER) as a function of the normalized Doppler spreading ($B_D T_S$)

FIG. 3 thus shows the variation of the BER as a function of the normalized Doppler spreading $B_D T_S$, which is the product of the Doppler spreading $B_D$ and the symbol duration $T_S$ that characterizes the variation intensity of the channel due to displacement of the transmitter and/or receiver. Doppler spreading is proportional to the speed of the mobile terminal and to the carrier frequency. The frequency instability of the local oscillator, which is ignored here, introduces additional performance deteriorations. Like the GSM system, the behavior of the BER was evaluated for timeslots composed of N=148 symbols each. The MDP4 modulation was selected (modulation with 4-state phase displacement). The discrete channel considered is composed of two paths (L=2) with the same average power. The $\overline{E}_S/M$ ratio between the average energy received per symbol and the noise level is 10 dB. Three configurations were considered:

A central reference sequence consisting of 26 bipolar symbols taken at random among the 8 sequences used in the GSM system. These sequences are cyclic extensions to the 8 CAZAC sequences with length 16 [1, 11].

A central reference sequence −1, +1, +1, +1, −1, of 5 bipolar symbols obtained by cyclic extension (except for a sign and an offset) of the unique bipolar CAZAC sequence with length 4, namely −1, +1, +1, +1.

Five groups of reference sequences distributed across the entire timeslot to be processed, identical to the previous central reference sequence of the five bipolar symbols (total of 25 reference symbols).

FIG. 3 shows representative curves corresponding to the following cases:

41: conventional receiver, first configuration,
42: conventional receiver, second configuration
43: receiver according to the invention, second configuration,
44: conventional receiver, third configuration,
45: receiver according to the invention, third configuration.

These results show that when sequences grouped at the mid-point of each timeslot (first and second configurations) are used, it is impossible to go outside normalized Doppler spreading $B_D T_S = 1/2500$ without significantly deteriorating performances. Conversely, the use of groups of small distributed sequences (third configuration) makes it possible to achieve standardized Doppler spreading close to $B_D T_S = 1/100$ without any perceptible deterioration. This significant improvement in the robustness of the receiver with regard to the Doppler effect, and possibly the frequency instability of the local oscillator, is due to the distribution of reference sequences, which makes it possible to more precisely monitor any variation of the channel with time.

Table 1 contains figures characterizing the improved performances provided by the invention with regard to the improved conventional algorithm used in the GSM system. In this table, C.R. means "conventional receiver" and I.R. means receiver according to the invention. The $\overline{E}_S/N_o$ ratio between the average energy received per symbol and the noise level is 10 dB. The improvement due to the invention is negligible in the case of a long central reference sequence (first configuration).

TABLE 1

| Normalized DOPPLER spreading ($B_D T_S$) | First configuration | | Second configuration | | Third configuration | |
|---|---|---|---|---|---|---|
| | C.R. | I.R. | C.R. | I.R. | C.R. | I.R. |
| 1/2500 | 0.0099 | 0.00855 | 0.01584 | 0.0089 | 0.0105 | 0.0077 |
| 1/100 | x | x | x | x | 0.0143 | 0.0083 |

In this case, the reference sequence is sufficiently long to guarantee a good channel estimating quality, without the use of unknown data sequences. However, in the case of a single short reference sequence (second configuration), the receiver according to the invention can give better performances than a conventional receiver, but also the performances are comparable to performances obtained with the long reference sequence of 26 reference symbols. Consequently, the receiver according to the invention is made insensitive to even a large reduction in the size of the reference sequence. This result is explained by the fact that the channel estimate makes use of symbols in data sequences that cooperate with reference symbols. In the case of five groups of short reference sequences (third configuration), the receiver according to the invention is capable of keeping the bit error rate almost unchanged by varying the normalized Doppler spreading between 1/2500 and 1/100.

Figure 4:
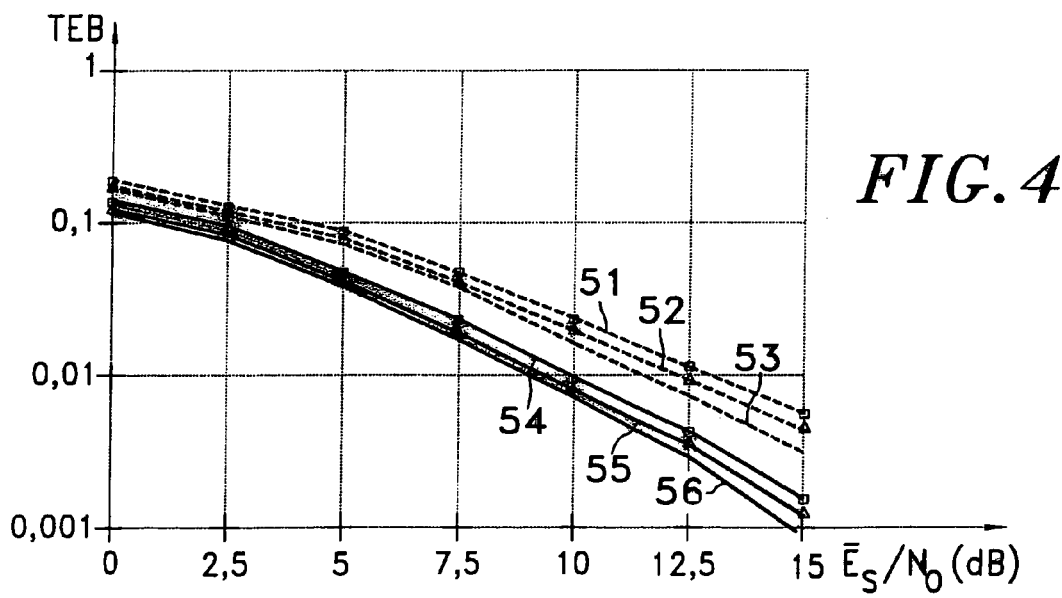
FIG. 4 shows variations of the bit error rate (BER) as a function of the $\overline{E_S}$/No ratio for MDP4 and MDP8 modulations, in a first configuration and for a discrete channel with two paths.
Figure 5:
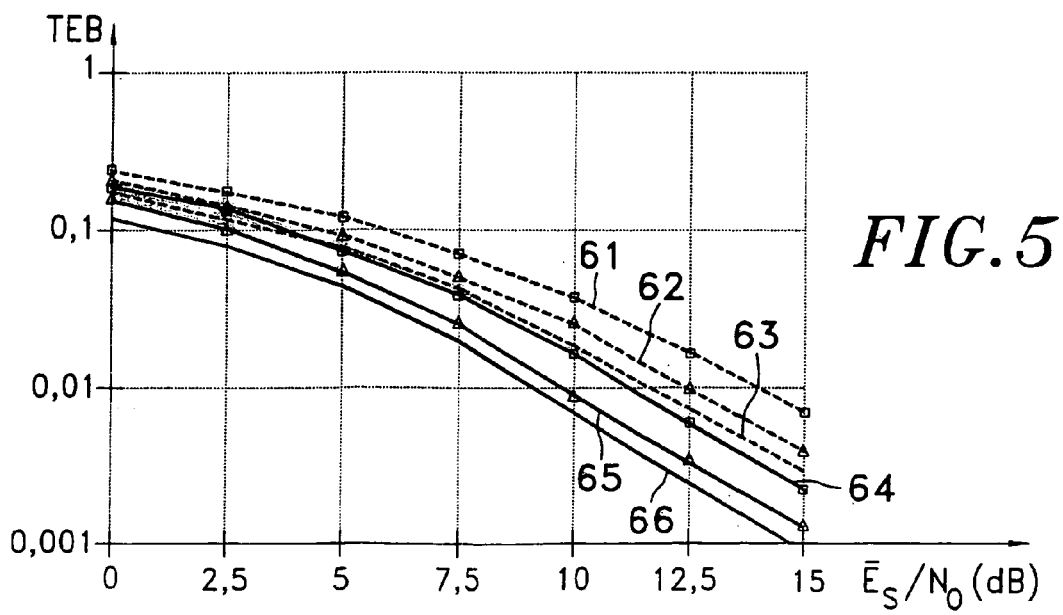
FIG. 5 shows variations of the bit error rate (BER) as a function of the $\overline{E_S}$/No ratio for the MDP4 and MDP8 modulations in a second configuration with a discrete channel with two paths.
Figure 6:
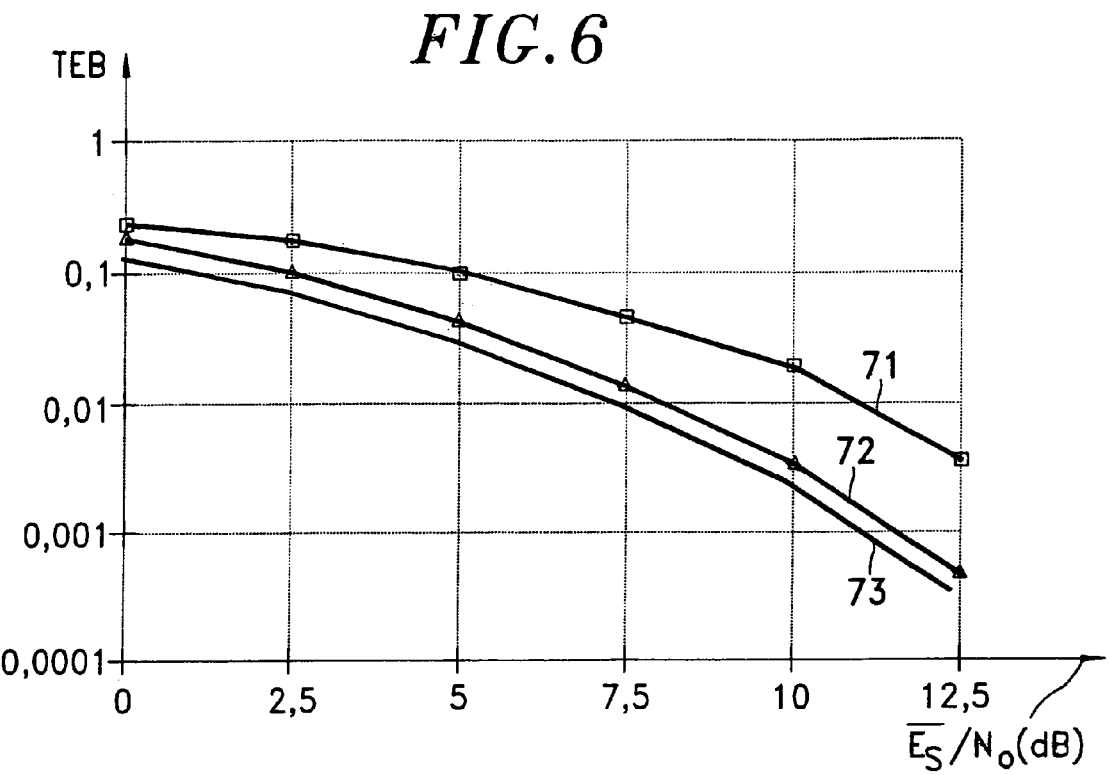
FIG. 6 shows variations of the bit error rate (BER) as a function of the $\overline{E_S}$/No ratio for an MDP4 modulation using the second configuration and a discrete channel with four paths.

FIGS. 4, 5 and 6 show the bit error rate as a function of the $\overline{E}_S/N_o$ ratio between the average energy received per symbol and the noise level for normalized Doppler spreading $B_D T_S = 1/2500$ which is not very severe.

Like the GSM system, the behavior of the BER was evaluated for timeslots composed of N=148 symbols each. However, the selected modulations are MDP4 and MDP8 modulations. The discrete channel considered is composed of one (L=1) or two (L=2) or four (L=4) paths with the same average power. Two configurations were considered:

A central reference sequence of 26 bipolar symbols taken from the 8 sequences used in the GSM system. These sequences are cyclic extensions of the 8 CAZAC sequences with length 16 [1, 11].

A central reference sequence −1, +1, +1, +1, −1 for two paths and −1, +1, +1, +1, −1, +1, +1 for four paths with 4+L−1 bipolar symbols obtained by cyclic extension of the unique (except for a sign and an offset) bipolar CAZAC sequence with length 4, namely −1, +1, +1, +1

For FIG. 4, the selected modulations are MDP4 and MDP8 modulations using the first configuration with two paths (L=2). The curves are applicable to the following cases:

51: MDP8, conventional receiver,
52: MDP8, receiver according to the invention,
53: MDP8, receiver with perfectly known discrete channel,
54: MDP4, conventional receiver,
55: MDP4, receiver according to the invention,
56: MDP4, receiver with perfectly known discrete channel.

In FIG. 5, the selected modulations are the MDP4 and MDP8 modulations using the second configuration and a discrete channel with two paths (L=2). The curves are applicable to the following cases:

61: MDP8, conventional receiver,
62: MDP8, receiver according to the invention,
63: MDP8, receiver with perfectly known discrete channel,
64: MDP4, conventional receiver,
65: MDP4, receiver according to the invention,
66: MDP4, receiver with perfectly known discrete channel.

In FIG. 6, the selected modulation is the MDP4 modulation with the second configuration and a discrete channel with four paths (L=4). The curves are applicable to the following cases:

71: conventional receiver,
72: receiver according to the invention,
73: receiver with perfectly known discrete channel.

The curves in FIGS. 4 and 5 show that, unlike a receiver according to the invention, the performances of a conventional receiver in the GSM system are very sensitive to the length of the reference sequence used and deteriorate significantly between the first configuration and the second configuration. The curves in FIGS. 5 and 6 also show that performance deteriorations with a conventional receiver increase significantly with the number of paths although conversely these deteriorations remain almost unchanged and are low for a receiver according to the invention. Therefore, the receiver according to the invention has excellent robustness with respect to any reduction in the length of the reference sequence and any increase in the number of channel paths.

Table 2 contains figures characterizing the improvement in performances provided by the receiver according to the invention compared with the improved GSM system algorithm, for the MDP4 modulation. The $B_D T_S$ ratio is equal to 1/2500, and the bit error rate is equal to $10^{-2}$ and N=148.

TABLE 2

| | Gain in dB | | |
|---|---|---|---|
| Number of paths (L) | Long reference sequence | Short reference sequence | Receiver according to the invention with short sequence, conventional receiver with long sequence |
| 1 | 0.03 | 1.03 | 0.03 |
| 2 | 0.48 | 1.83 | 0.48 |
| 4 | 1.42 | 3.04 | 1.43 |

This table shows that a receiver according to the invention always has better performances than an improved conventional receiver, for a given length (first or second configuration) of the reference sequence. These results also show that the improvement provided by the invention is particularly significant when the length of the reference sequence is short or when the number of paths in the channel is increased. These results also show that even with a short reference sequence (second configuration), a receiver according to the invention always has better performances than a conventional receiver with a long reference sequence (first configuration).

Figure 7:
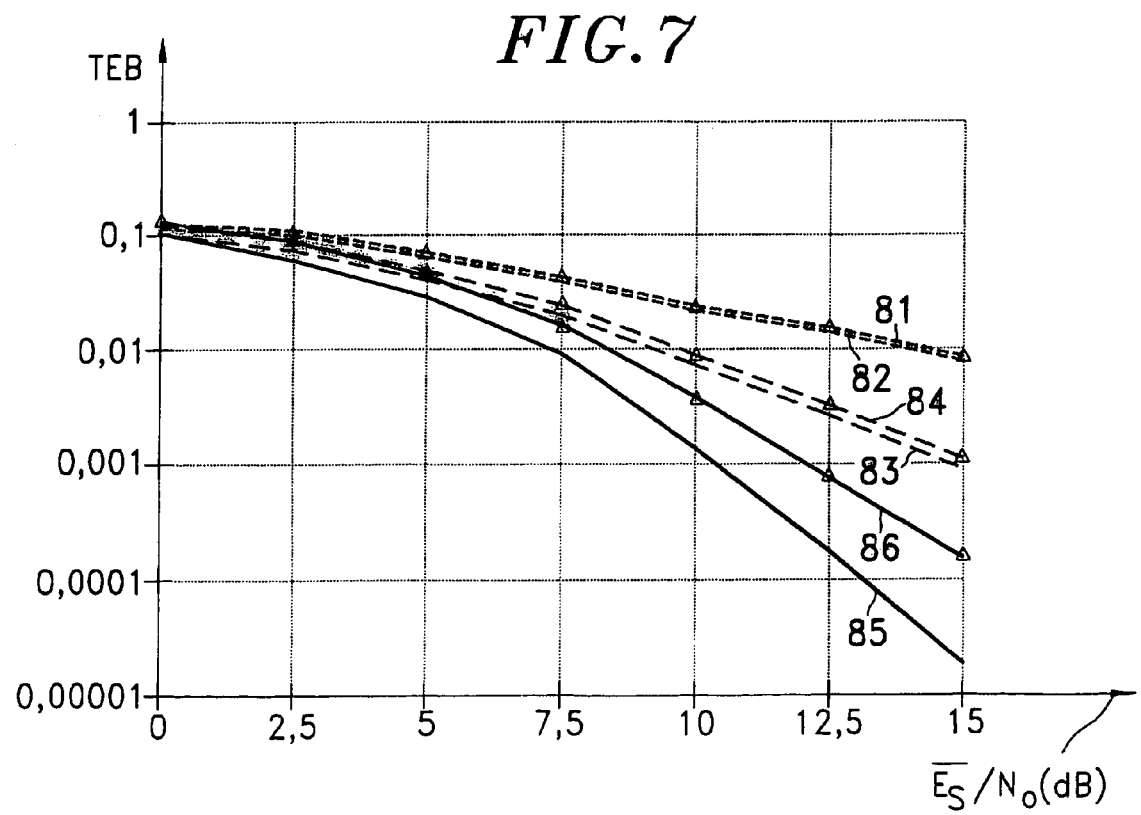
FIG. 7 shows variations of the bit error rate (BER) as a function of the $\overline{E_S}$/N ratio for an MDP4 modulation using a discrete channel with one, two and four paths.

FIG. 7 shows the bit error rate as a function of the $\overline{E_S}/N_o$ ratio for severe normalized Doppler spreading $B_D T_S=1/100$ and timeslots each composed of N=100 symbols. The MDP4 modulation is always selected. The discrete channel considered is composed of one (L=1) or two (L=2) or four (L=4) paths with the same average power. A single configuration with three distributed reference sequences is considered. Each sequence is composed of 4+L−1 bipolar symbols and is obtained by cyclic extension (expect for a sign and an offset) of the single bipolar CAZAC sequence with length 4, namely −1, +1, +1, +1.

The value of Doppler spreading considered is sufficiently severe so that a conventional receiver cannot follow the variations of each path of the discrete channel that may be affected by phase rotations equal to ±π between the beginning and end of each timeslot.

The curves in FIG. 7 are applicable to the following cases:
81: L=1, receiver with perfectly known discrete channel,
82: L=1, receiver according to the invention
83: L=2, receiver with perfectly known discrete channel
84: L=2, receiver according to the invention
85: L=4, receiver with perfectly known discrete channel
86: L=4, receiver according to the invention.

The curves in FIG. 7 show that the receiver according to the invention has very little deterioration of performances compared with an ideal receiver that knows the discrete channel perfectly. This deterioration is of the order of 0.4 dB for one path (L=1), 0.5 dB for two paths (L=2) and 1 dB for four paths (L=4).

Now that we have described the performances of the process according to the invention, the reception phase and particularly the received signal processing will be described in more detail.

A receiver according to the invention determines the production of the most probable discrete channel during a given timeslot, depending on the samples received from the block to be processed. This determination is made using a Maximum A Posteriori (MAP) probability criterion. This channel estimate requires knowledge of a priori probabilities of symbols in transmitted data sequences.

In order to simplify the description, the following mathematical discussions and the corresponding figures are always applicable to the case in which each block to be processed for the channel estimate is composed solely of received samples related to a single timeslot. The case in which symbols (reference or other symbols) from other timeslots (from the same user or from other users, from the common signaling channel, etc.) are used, is dealt with in the same way.

Figure 1:
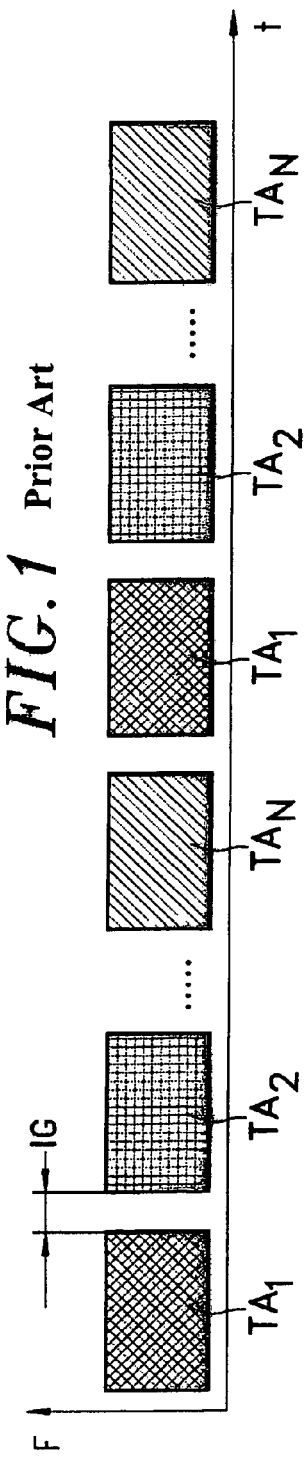
FIG. 1, already described, shows the distribution of timeslots allocated to several users.
Figure 2:
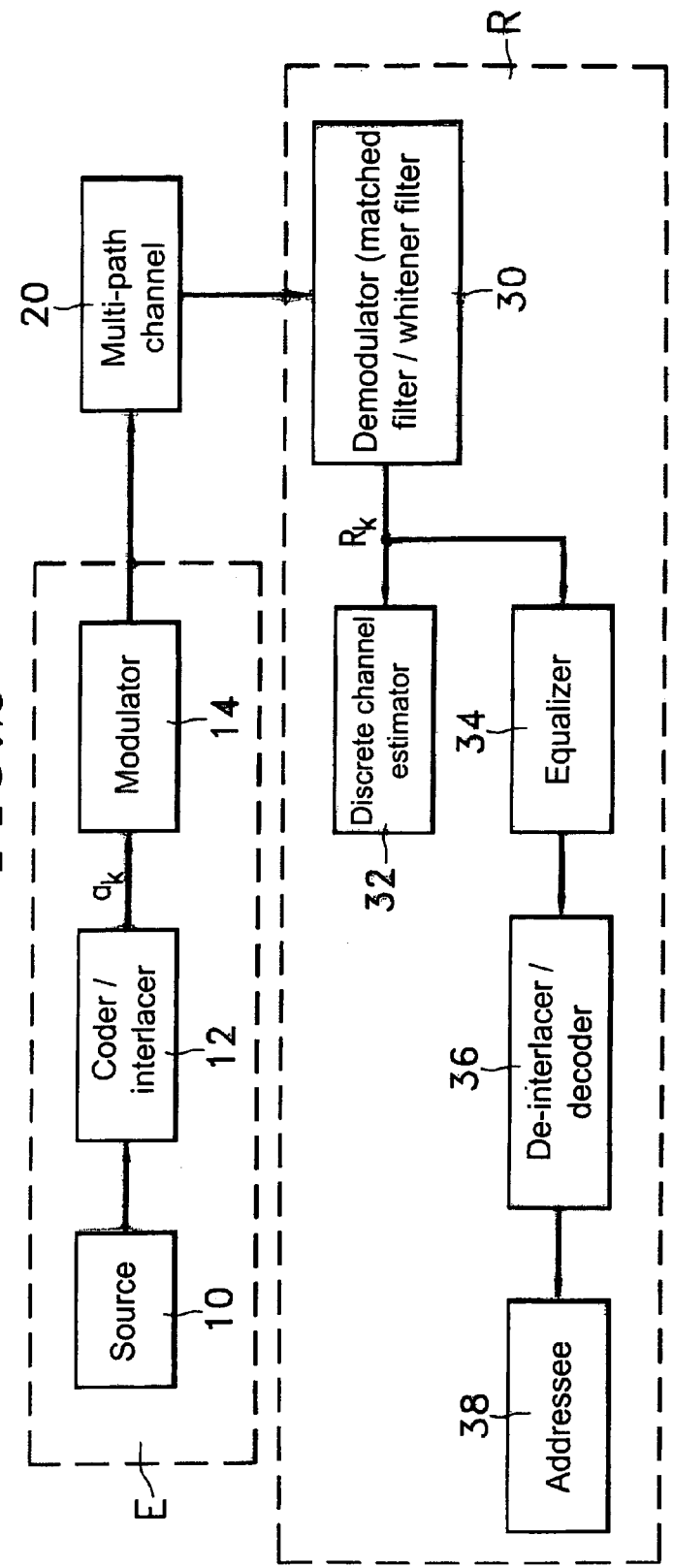
FIG. 2, already described, is a diagram illustrating transmission and reception using the TDMA technique.

The transposition operator is denoted (.)'. As shown in FIG. 2, every timeslot for a given user is composed of a series of N symbols $a_0, a_1, \ldots, a_{N-1}$ that can be written in the form of a column vector $$a=(a_0, a_1, \ldots, a_{N-1})'$$

the N symbols possibly being phase modulated (MDP2, MDP4, MDP8, ...). The transmitted energy $E_k$ associated with each symbol $a_k$ is independent of values taken on by this symbol but it may vary from one symbol in the timeslot to another. This variation is usually the consequence of the TDMA system allocating different energies to data sequences and to reference sequences. Also as shown in the same figure, samples at the output from the whitener filter corresponding to this timeslot form a column vector $$R=(R_0, R_1, \ldots, R_{N-1}, R_N, \ldots, R_{N+L-2})'$$

with N+L−1 components, where L is the number of paths in the discrete channel.

Figure 8A:
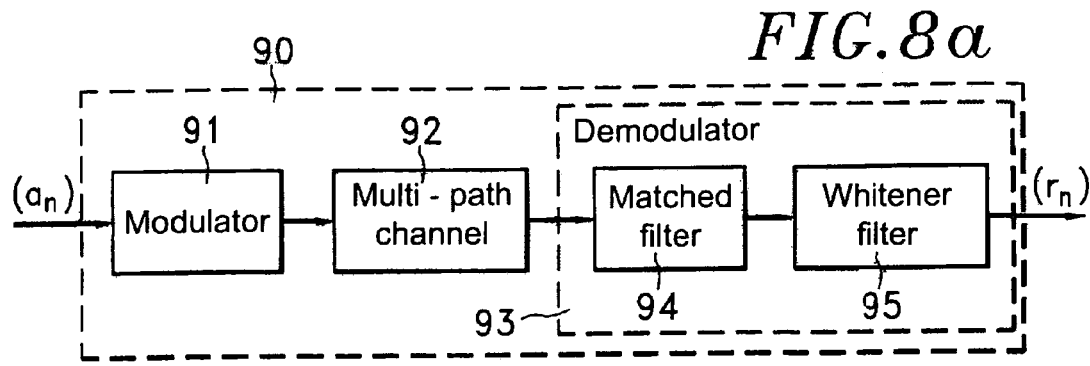
FIG. 8 is a view of the discrete channel seen at the output from the whitener filter, in the form of an offset register.

FIG. 8a shows all means between the input to the transmitter modulator and the output from the receiver whitener filtering. Therefore this figure shows a view of the real radioelectric channel and the processing done in the receiver (demodulation, matched filtering and whitening filter). This figure shows the modulator 91, a block 92 symbolizing the multi-path channel, the demodulator 93 with its matched filter 94 and its whitener filter 95.

Figure 8B:
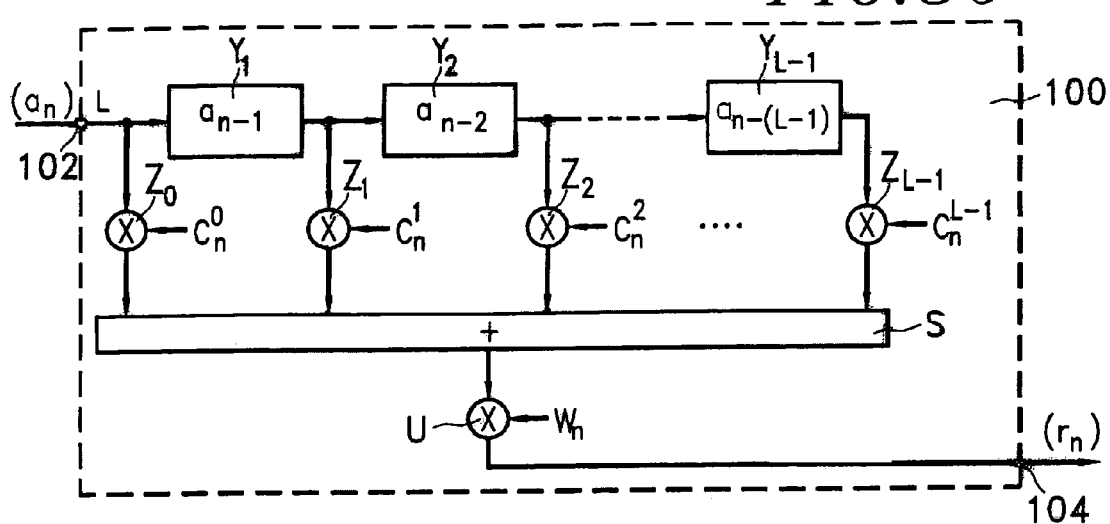

FIG. 8b shows a view of these means in the form of an offset register with (L−1) cells $Y_1, Y_2, \ldots, Y_{L-1}$. This register receives the current symbol $a_n$ and the cells contain the symbols with a delay of one symbol period namely $a_{n-1}, a_{n-2}, \ldots, a_{n-(L-1)}$. The circuit shown also comprises (L) multipliers $Z_0, Z_1, \ldots, Z_{L-1}$ that contain (L) coefficients $C_n^0, C_n^1, \ldots C_n^{L-1}$ respectively, an adder S connected to the multipliers, and a final adder receiving a signal $w_n$ representing a noise. This final adder outputs a signal $r_n$.

Each received sample may be written in the following form:

$$R_k = \sum_{l=0}^{L-1} c_k^l a_{k-l} + W_k, k = 0, 1, \ldots, N+L-2,$$

where $c_k^l$ is the $l^{th}$ coefficient of the discrete channel filter at the $k^{th}$ sampling instant and $W_k$ is a white Gaussian additive noise. To simplify the presentation and make concise equations, the coefficients $c_k^l$ for the discrete channel satisfying k<1 or k>N+1 are used in the expression of $R_k$ although they are equal to zero. For the same reason, the transmitted symbols $a_k$ satisfying k<0 or k>N−1 appear in this expression of $R_k$ although they are equal to zero.

The discrete channel coefficients are almost decorrelated between different discrete paths (independent of the variable 1). Ignoring the effects of modulation and demodulation, this property is due to the fact that the multiple paths in the real radioelectric channel are independent. However, the coefficients of the same discrete path 1 are correlated with each other (dependent on the variable k). Their discrete autocorrelation function defined by $$\phi_{m-n}^l = E[c_m^l(c_n^l)]$$

depends only on the Doppler power spectrum for the corresponding path.

Doppler power spectra usually encountered in radiomobile communications are either conventional (in external environments) or flat (in internal environments). The autocorrelation function for the $l^{th}$ path with average power $\phi_0^l$ is given by $$\phi_k^l = \phi_0^l \sin(\pi k B_D T_S)$$

in the case of a conventional Doppler power spectrum and by $$\phi_k^l = \phi_0^l \sin(\pi k B_D T_S)/\pi k B_D T_S$$

in the case of a flat Doppler power spectrum, where $J_0(.)$ is the first type of Bessel function with order 0 [3, 12]. The average power $\phi_0^l$ varies from one path to another and characterizes the multipath intensity profile [3] of the discrete channel.

The receiver according to the invention must use the maximum a posteriori (MAP) criterion to determine the most probable implementation of the vectors $$c^l = (c_l^l, C_{l-1}^l, c_{l-2}^l, \ldots, C_{N+l-1}^l)^t, l = 0.1, \ldots, L-1$$

characterizing the L discrete paths selected by the receiver for equalization. Consequently, it needs an appropriate representation of the discrete channel that it can use to become independent from the time correlation of coefficients for the same path. It also needs a representation that enables it to be independent of the variation (if any) of transmitted energy between one symbol in the timeslot and the next. This representation is obtained firstly by adding the vector of normalized transmitted symbols $$A = (A_0, A_1, \ldots, A_{N-1})^t$$

with components $A_k = a_k 1mt;rl;\sqrt{italEmedinfbeginitalkendi-talresetrlxmx}$ with a constant modulus equal to *one*. It is also *obtained by rewriting the samples received during a timeslot in the following form:*

$$R_k = \sum_{l=0}^{L-1} C_k^l A_{k-l} + W_k, k = 0, 1, \ldots, N+L-1,$$

where $C_k^l$ is the $k^{th}$ component of the associated normalized vector $$C^l = (c_l^l \sqrt{E_0}, c_{l+1}^l \sqrt{E_1}, c_{l+2}^l \sqrt{E_2}, \ldots, c_{N+l-1}^l \sqrt{E_{N-1}})$$

and directly characterizing the $l^{th}$ path in the discrete channel. Finally, it is acquired using a KARHUNEN-LOEVE decomposition [3] of each normalized vector C' in an orthogonal base $\{B^{1k}\}_{k=0}^{N-1}$ taking account both of the variation of energy in transmitted symbols and characteristics of the Doppler power spectrum for the $l^{th}$ path [3]. With this decomposition, the normalized vector C' (with correlated time components) of the $l^{th}$ discrete path can be described by an equivalent column vector $G^1 = (G_0^1, G_l^1, \ldots, G_{N-1}^1)$, in which the N components are well decorrelated. The vector C' may be built up from its appropriate representation G' by the following transformation $$C^l = \sum_{k=0}^{N-1} G_k^l B^{1k}$$

Conversely, the components of this appropriate representation $G^1$ may be found within the same vector $C^1$ by the inverse transformation $$G_k^l = (B^{1k})^{*t} C^1, k=0, 1, \ldots, N-1,$$

where (.)* is the conjugation operator.

In accordance with the properties of the KARHUNEN-LOEVE decomposition [3], the vectors of the orthonormal base associated with the $l^{th}$ path are simply the eigenvectors of the co-variance matrix H' of the normalized vector C' associated with this path. Furthermore, the associated eigenvalues $\{\lambda^{1k}\}_{k=0}^{N-1}$ are simply the variances of the $G_0^1$, $G_l^1, \ldots, G_{N-1}^1$ components of the appropriate representation G' of the corresponding path. Therefore, the vectors $\{B^{1k}\}_{k=0}^{N-1}$ associated with each path, and the corresponding eigenvalues can be obtained from the matrix equations $$H^1 B^{1k} = \lambda^{1k} B^{1k}, k=0, 1, \ldots, N-1$$

The $(m, n)^{th}$ entry in the co-variance matrix H' of the normalized vector associated with the $l^{th}$ path is given directly by $$H_{mn}^l = E[C_m^l(C_n^l)^*] = \sqrt{E_m E_n} \phi_{m-n}^l,$$

where $\phi_{m-n}^l$ denotes the discrete autocorrelation function of this path defined above.

The receiver according to the invention must normally have L orthonormal bases associated with each of the L paths in the discrete channel in order to rebuild or decompose any intermediate or final estimate of the discrete channel. In practice, the shapes of the Doppler power spectra for the L channel paths are identical. Therefore the associated co-variance matrices $\{H^1\}_{l=1}^{L-1}$ are identical, except for a multiplication factor, and the corresponding orthonormal bases are also identical. A single orthonormal base in the receiver is then usually sufficient to estimate the channel satisfactorily.

In order to generate the orthonormal base for the $l^{th}$ path, the receiver must have the most precise possible estimate of the co-variance matrix H' for this path. Consequently, it must have the most precise possible knowledge of the characteristics of the Doppler power spectrum of the radioelectric channel. This knowledge is regularly updated and must include an estimate of Doppler spreading $B_D$, or an upper limit to it. It may possibly comprise an estimate of the average power of each path in the discrete channel and the shape of the Doppler power spectrum. Depending on this knowledge, the receiver may either calculate appropriate orthonormal bases in real time, or search in a bank of pre-calculated orthonormal bases for the bases that best match the characteristics of the real channel. In general, the receiver does not have precise knowledge of the shape of the Doppler power spectrum, or perfect and instantaneous knowledge of Doppler spreading. In this typical case, it may be assumed that the Doppler power spectrum is flat, and that the real Doppler spreading is equal to the upper limit of Doppler spreading. Furthermore, the receiver does not need to have a precise estimate of the average power of each of the discrete channel paths taken individually. Also in this case, a discrete channel with L paths with equal average powers may be assumed.

The estimate of the c' vectors characterizing the L discrete channel paths is made iteratively using the MAP criterion through the normalized vectors C' or their appropriate representation G'. This estimate may take optimal account both of the characteristics of the data symbols and the transmitted reference symbols (statistics and energy) and the characteristics of the multi-path channel.

The MAP estimate $\{\hat{G}^1=\}_{l=0}^{L-1}$ of one embodiment of the appropriate representation $\{G^1\}_{l=0}^{L-1}$ of the discrete channel is equal to $$\{\hat{G}^1\}_{l=0}^{L-1} = \arg\max_{\{G^1\}_{l=0}^{L-1}} p(\{G^1\}_{l=0}^{L-1} \mid R),$$

which maximizes the conditional a posteriori probability density $p(\{G^1\}_{l=0}^{L-1}|R)$. According to the invention, a solution as close as necessary to the exact solution can be obtained by iteration using the SAGE extension [7] of the EM algorithm [8, 9].

In general, the conditional a posteriori probability density $p(\{G^1\}_{l=1}^{L-1}|R)$ to be maximized has several global maxima, frequently leading to an ambiguity in the channel estimate according to the MAP criterion. This ambiguity may be cleared using reference symbols known to the receiver. However, this if often insufficient, since this conditional probability density also has local maxima that can be reached by the SAGE algorithm instead of the single global maximum. In order to avoid this problem, reference symbols have to be used to appropriately determine the initial conditions $\{G^{1(0)}\}_{l=0}^{L-1}$.

The SAGE algorithm successively re-estimates each of the G' vectors by induction, keeping the previous estimates of the other vectors $G^m$ unchanged, with $m \neq 1$. In accordance with the properties of the SAGE algorithm, these successive re-estimates guarantee monotonous growth of the conditional a posteriori probability density $p(\{G^1\}_{l=0}^{L-1}|R)$.

Given the vector R of samples received during a timeslot to be processed, the receiver begins by calculating the initial conditions $\{G^{1(0)}\}_{l=0}^{L-1}$ of vectors $\{G^1\}_{l=0}^{L-1}$ starting from samples that only depend on reference sequences. Consequently, the reference sequences must be such that a fast and simple separation of the contributions of the L paths to each of these samples is guaranteed. In order to be able to make an initial estimate to get the channel estimating algorithm started, one or several reference sequences are necessary each having good autocorrelation properties. Like the GSM system, these sequences may be built starting from CAZAC sequences by extension or circular swapping. These sequences are composed of symbols with a constant modulus and with a zero circular autocorrelation function everywhere except at the origin. For the purposes of this invention, it is preferable to have CAZAC sequences with symbols belonging to modulation constellation used to transfer data symbols. For example, for an MDP2 modulation, the shortest CAZAC sequence alone (except for a sign and a circular swap), namely $\{-1, +1, +1, +1\}$ only has four symbols. For an MDP4 modulation, using the $\{1, i, -1, i\}$ constellation, the shortest CAZAC sequence alone (still with a multiplication factor i, $-1$ or $-i$, and except for a circular offset), namely $\{1,i\}$ is composed of only 2 symbols.

A reference sequence based on a CAZAC sequence with length M can only estimate up to M paths of the discrete channel. It is obtained by cyclic extension of L−1 positions of this CAZAC sequence and contains a total of M+L−1 symbols. Therefore the length M of the CAZAC sequence needs to be greater than or equal to the number of paths L of the discrete channel to be estimated. For the purposes of this invention, it is sometimes desirable to use short CAZAC sequences for a small number of paths L to be estimated (less than or equal to 4 for an MDP2 modulation and 2 for MDP4, MDP8 modulations, etc.), since they can significantly reduce the total number of reference symbols per timeslot, while guaranteeing more regular and more frequent sampling of the discrete channel, particularly in an environment with large Doppler spreading.

Figure 9:
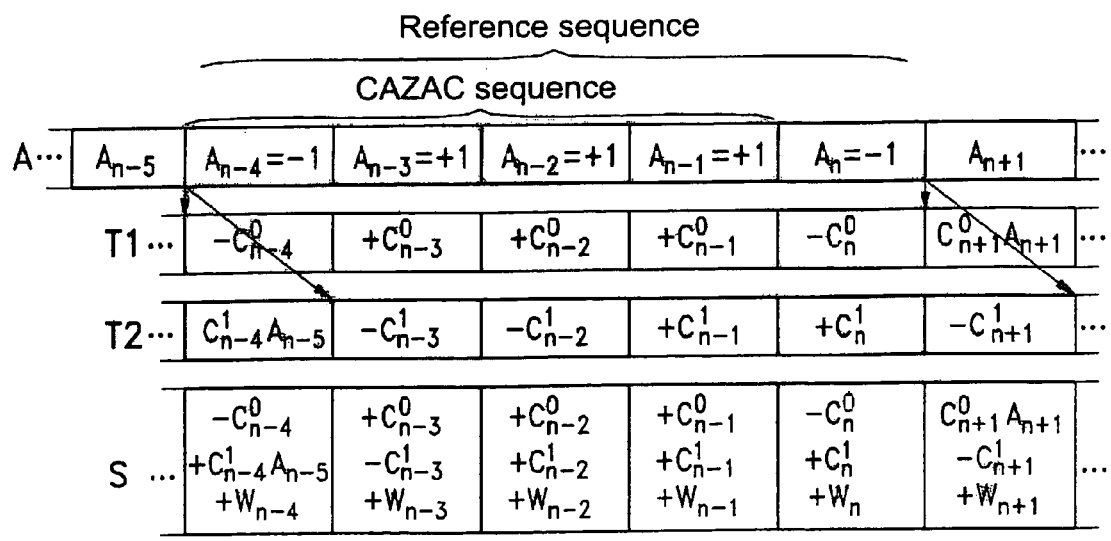
FIG. 9 illustrates the estimate of the filter coefficients of the discrete channel by correlation of received samples with a CAZAC sequence and its circular offsets.

FIG. 9 illustrates the estimate of a discrete channel composed of two paths (L=2) in the case of an MDP2 modulation. The first line A gives the reference sequence, the second line T1 corresponds to the first path, the third line T2 corresponds to the second path and the fourth line S gives the composition of the received samples. The elementary reference sequence used $\{-1, +1, +1, +1, -1\}$ composed of 5 symbols (M+L−1=5) is simply the circular extension of a single position in the CAZAC sequence $\{-1, +1, +1, +1\}$ composed of four symbols (M=4). As shown in FIG. 5, the elementary reference sequence occupies positions between n−4 and n in the timeslot to be processed. The received samples are dependent solely on this sequence, and occupy positions between n−3 and n. They are given explicitly by:

$R_{n-3}=C_{n-3}{}^0A_{n-3}+C_{n-3}{}^1A_{n-4}+W_{n-3}=C_{n-3}{}^0-C_{n-3}{}^1+W_{n-3}$ $R_{n-2}=C_{n-2}{}^0A_{n-2}+C_{n-2}{}^1A_{n-3}+W_{n-2}=C_{n-2}{}^0+C_{n-2}{}^1+W_{n-2}$ $R_{n-1}=C_{n-1}{}^0A_{n-1}+C_{n-2}{}^1A_{n-2}+W_{n-1}=C_{n-1}{}^0+C_{n-1}{}^1+W_{n-1}$ $R_n=C_n{}^0A_n+C_n{}^1A_{n-1}+W_n=-C_n{}^0+C_n{}^1+W_n$

If the estimate of the coefficients $C_k{}^0$ and $C_k{}^1$ in the normalized discrete channel is to be only slightly biased for a value of k between n−3 and n, it has to be assumed that Doppler spreading is sufficiently low to guarantee negligible channel variation between positions n−3 and n. In this case, an approximate estimate of these coefficients is obtained by correlating the $R_k$ samples, where k is between n−3 and n, with the CAZAC sequence itself and a circular offset of a position towards its left. The correlation with the CAZAC sequence $\{-1, +1, +1, +1\}$ gives:

$C_{n-3}{}^1=C_{n-2}{}^1=C_{n-1}{}^1=$
$C^{n1}=(-R_{n-3}+R_{n-2}+R_{n-1}+R_n)/4=(C_{n-3}{}^1+C_{n-2}{}^1+C_{n-1}{}^1+C_n{}^1)/4+W_n{}^1$ as a first estimate of the samples n−3, n−2, n−1 and n in the second path, where $W_n^1$ is a term that takes account of noise and bias. The correlation with the sequence obtained after circular offset {+1, +1, +1, −1}, gives $$C_{n-3}^0 = C_{n-2}^0 = C_{n-1}^0 =$$
$$C_n'^0 = (-R_{n-3} + R_{n-2} + R_{n-1} + R_n)/4 = (C_{n-3}^0 + C_{n-2}^0 + C_{n-1}^0 + C_n^0)/4 + W_n^1$$

as the first estimate of samples at instants n−3, n−2, n−1 and n of the first path, where $W_n^0$ is a term that plays the same role as $W_n^1$.

In the general case, the coarse estimate of the L channel coefficients at a given instant in the timeslot is obtained by correlation of samples that depend solely on the reference sequence with L offset versions of the corresponding CAZAC sequence.

Each reference sequence built up by circular extension of a CAZAC sequence can be used to obtain a noisy sample of each of the discrete channel paths. The number of samples per timeslot necessary for reconstruction of the channel depends on the normalized Doppler spreading $B_D T_S$ and the number N of symbols making up this timeslot. As the product $B_D T_S N$ increases, the variation in the channel from one end of the timeslot to the other increases, and the number of elementary reference sequences needs to be greater. An elementary reference sequence is a sub-set of grouped symbols in the reference sequence associated with the timeslot obtained starting from a circular extension of a CAZAC sequence.

Figure 10:
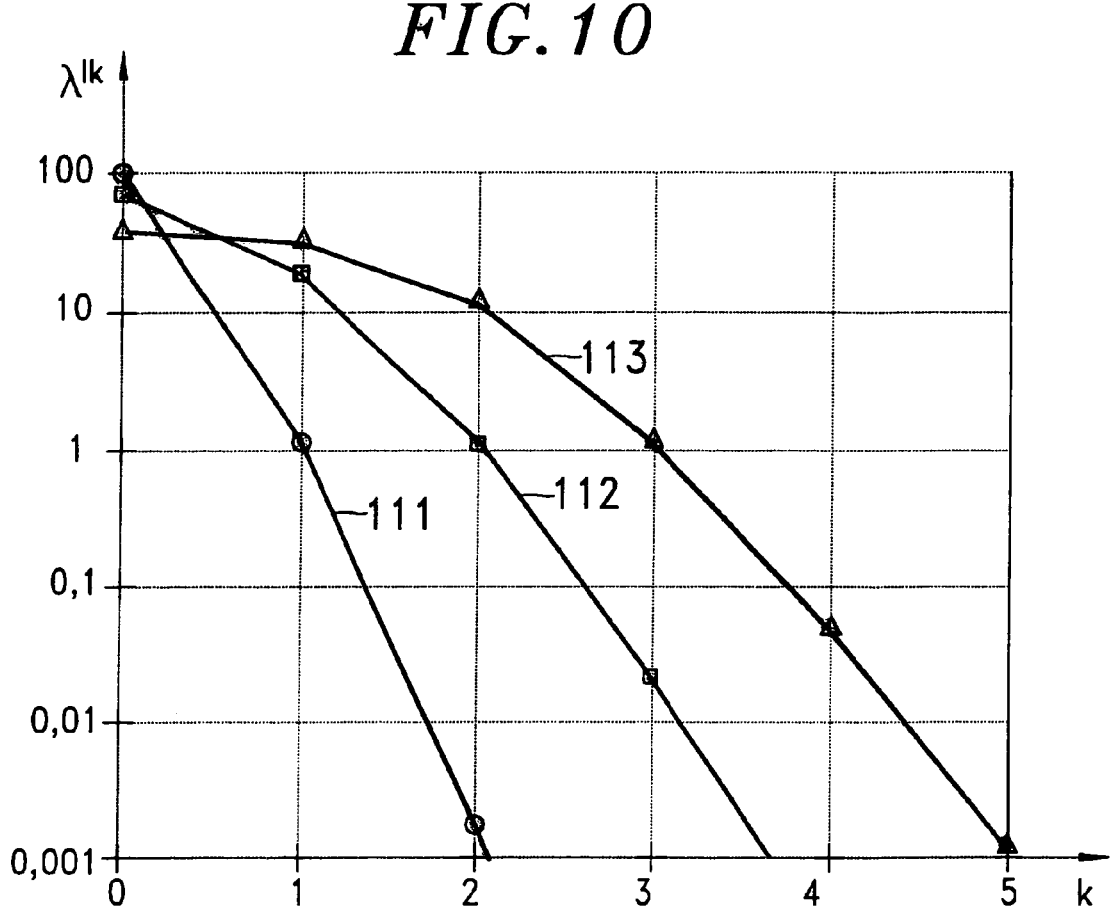
FIG. 10 shows the distribution of the largest eigenvalues of the covariance matrix for three normalized Doppler spreadings.

In accordance with the properties of the KARHUNEN-LOEVE decomposition of the discrete channel, a higher value of the eigenvalue $\lambda^{1k}$ for a given path l will lead to a higher average value of the contribution $G_k^1 B^{1k}$ of the eigenvector associated with the appropriate representation of this path. FIG. 10 shows the distribution of the largest eigenvalues for a timeslot of N=100 symbols with the same energy normalized to 1 and normalized Doppler spreading $B_D T_S$ equal to 1/50 (curve 113), 1/100 (curve 112), and 1/500 (curve 111) respectively. This figure clearly shows that an appropriate representation of each of the paths of the discrete channel can be based on the few eigenvectors that have the largest eigenvalues, with no significant loss of performance. For low values of the product $B_D T_S$, the eigenvector with the largest eigenvalue alone is sufficient to give a precise representation of each of the paths of the discrete channel. This eigenvector then varies very slowly with time, and therefore a reference sequence grouped at the mid-point of each timeslot can be used to rebuild a discrete channel that is practically constant over the entire timeslot. This is the case for the GSM system in which normalized Doppler spreading is assumed to be very weak and the channel is assumed to be constant over a given timeslot.

For slightly higher normalized Doppler spreading, the two eigenvectors associated with the two largest eigenvalues are necessary for a precise reconstruction of the discrete channel. These two vectors vary sufficiently so that a reference sequence composed of two elementary sequences located on each side of the mid-point of the timeslot are necessary. to be used also increases. Furthermore, for a constant length of the reference sequence, as the number of elementary reference sequences increases, the length of each sequence needs to be reduced. For a given number of paths L, the length of an elementary sequence M+L−1 can be reduced to 2L−1 at best, by choosing a CAZAC sequence with length L; this is why it is useful to have very short CAZAC sequences. According to the invention, the CAZAC sequence {−1, +1, +1, +1} with length M=4 is recommended for all phase modulations when the number of paths L is less than or equal to 4 and the product $B_D T_S N$ is low. Also according to the invention, the CAZAC sequence {1,i} with length M=2 is recommended for a number of paths less than or equal to 2 and for fairly large products $B_D T_N$.

Let K be the number of elementary reference sequences per timeslot to be processed. Let $C_{k-M+1}^1, C_{k-M+2}^1, \ldots, C_k^1$, l=0, 1, ..., L−1, be the discrete channel samples procured by the $k^{th}$ elementary reference sequence and $S_k = \{k-M+1, k-M+2, \ldots, k\}$ be the set of indices of these samples. The initial conditions $\{G^{1(0)}\}_{l=0}^{L-1}$, of the appropriate channel representation according to the invention may be obtained from these samples using the following equations:

$$G_k^{1(0)} = w_k^1 \frac{\sum_{m=0}^{k-1} \sum_{n \in S_m} \tilde{C}_n^1 (B_n^{1k})^*}{N_k^1} \text{ or } N_k^1 = \sum_{m=0}^{k-1} \sum_{n \in S_m} |B_n^{1k}|^2 \text{ and}$$

$$w_k^1 = \frac{N_k^1}{N_k^1 + N_0/\lambda^{1k}}$$

The weighting factor $W_k^d$ depends on the normal $N_k^1$ of the restriction of eigenvectors to include only samples corresponding directly to channel samples procured by the reference sequence. It also depends on the quality of the contribution of the eigenvector $B^{1k}$ measured by the $\lambda^{1k}/N_0$ ratio. As the variance $\lambda^{1k}$ of the coefficient $G_k^1$ in the representation of the discrete channel increases in comparison with the variance $N_0$ of noise samples, the corresponding weighting also increases and approaches 1.

Still based on the vector R of samples received during a timeslot, the receiver according to the invention then gives an iterative estimate of the discrete channel starting from these initial conditions $\{G^{1(0)}\}_{l=0}^{L-1}$. According to the SAGE extension of the EM algorithm, the optimum channel estimator according to the MAP criterion iteratively calculates the re-estimate $\{G^{1(d+1)}\}_{l=0}^{L-1}$ starting from the estimate $\{G^{1(d)}\}_{l=0}^{L-1}$, for each path in turn. During each iteration, the channel estimator calculates the $G^{1(d+1)}$ vectors, where l=0, 1, ..., L'1, by successive approximations starting from the $\{G^{m(d-1)}\}_{m=1}^{L-1}$ and $\{G^{m(d)}\}_{m=1}^{L-1}$ vectors calculated beforehand. According to the invention, the $k^{th}$ component of the $(d+1)^{th}$ re-estimate $G^{1(d+1)}$ of the $G^1$ vector associated with the $l^{th}$ path is obtained using the expression:

$$G_k^{1(d+1)} = w_k^1 X$$

$$\left[ \sum_{n=1}^{N+1=l} \left( \sum_{A_n} \left[ R_n - \sum_{m=0}^{l-1} C_n^{m(d+1)} A_{n-m} - \sum_{m=l+1}^{L-1} C_n^{m(d)} A_{n-m} \right] A_{n-l}^* P\left(A_n \mid R_*, \{G^{m(d+1)}\}_{m=0}^{l-1}, \{G^{m(d)}\}_{m=1}^{L-1}\right) \right) (B_{n-1}^{1k})^* \right]$$

where $$w_k^1 = \frac{1}{1 + N_0/\lambda^{1k}}, A_n = (A_{n-(L-1)}, A_{n-(L-2)}, \ldots, A_n)$$

and $C_n^{m(d)}$ is the $n^{th}$ component of the reconstruction $C^{m(d)}$, using the KARHUNEN-LOEVE decomposition of the $m^{th}$ path of the discrete channel in the $d^{th}$ iteration. This reconstruction is given explicitly by $$C^{m(d)} = \sum_{k=0}^{N-1} G_k^{m(d)} B^{mk}.$$

As before, the weightings $w_k^1$ take account of the quality of the contribution of the vector $B^{1k}$ to the appropriate representation of the discrete channel. The higher the contribution of an eigenvector compared with the noise variance, the closer its weighting becomes to 1 and it plays an increasingly important role in the reconstruction of the channel estimate.

In order to estimate the appropriate representation $G^{1(d+1)}$ of the $l^{th}$ path in accordance with the previous expression, the receiver starts by calculating an estimate $$R_n - \sum_{m=0}^{l-1} C_n^{m(d+1)} A_{n-m} - \sum_{m=l+1}^{L-1} C_n^{m(d)} A_{n-m}$$

of $C_n^1 A_{n-1}$ by subtracting the contributions of the other paths $m \neq 1$. This subtraction is made assuming that the vector $A_n = (A_{n-(L-1)}, A_{n-(L-2)}, \ldots, A_n)$ is transmitted, which is why it is useful to weight this expression later by the conditional a posteriori probability $P(A_n|R_0\{G^{m(d+1)}\}_{m=0}^{.1=1.}\{G^{m(d)}\}m=1^{L-1})$ of actually having transmitted this vector. Once this estimate of $C_n^1 A_{n-1}$ has been made, the receiver multiplies it by the conjugate $A_{n-1}^*$ of $A_{n-1}$ to become independent of the modulation. This operation is done always assuming that the vector $A_n$ has been transmitted, which is why it is necessary to weight the resulting estimate:

$$\left(R_n - \sum_{m=0}^{l-1} C_n^{m(d+1)} A_{n-m} - \sum_{m=l-1}^{L-1} C_n^{m(d)} A_{n-m}\right) A_{n-1}^*$$

of $C_n^1$ by the conditional a posteriori probability of this vector having been transmitted. Obviously, the final estimate $$\sum_{A_n} \left[R_n - \sum_{m=0}^{l-1} C_n^{m(d+1)} A_{n-m} - \sum_{m=l+1}^{L-1} C_n^{m(d)} A_{n=m}\right]$$

$$A_{n-1}^* P(A_n | R_T\{G^{m(d+1)}\}_{m=0}^{l-1}T\{G^{m(d)}\}_{m=1}^{L-1})$$

of $C_n^1$ is obtained taking account of the contribution of all possible values of $A_n$.

Once this estimate $C_n^1$ of the $n^{th}$ sample of the $l^{th}$ path has been obtained for n between 1 and N+1−1, all that remains is for the receiver to project it on each of the vectors $B^{1k}$ of the orthonormal base associated with the appropriate representation of this path. The projection on the $k^{th}$ vector $B^{1k}$ is then weighted by $w_k^1$ to take account of the quality of its contribution to the estimate of the $l^{th}$ path of the channel in the $(d+1)^{th}$ iteration.

In practice, only a few basic vectors make an important contribution to the representation of each path. In this case, the number of vectors used in the KARHUNEN-LOEVE transformation and the inverse transformation may be reduced significantly with no perceptible drop in performances, while guaranteeing a significant drop in the complexity.

An iterative estimate of the discrete channel may be made a finite number of times D such that the global estimate $\{C^{1(D)}\}_{l=0}^{L-1}$ (obtained from $\{G^{1(D)}\}l=0^{L-1}$ using the KARHUNEN-LOEVE transformation) guarantees that any deterioration in the receiver's performances compared with the optimum solution that would be obtained after an infinite number of iterations would be imperceptible. This iterative estimate assumes that conditional a posteriori probabilities $P(A_n|R_0\{G^{m(d+1)}\}_{m=0}^{.1-1.}\{G^{m(d)}\}_{m=1}^{L-1})$ are known for all possible values of the $A_n = (A_{n-(L-1)}, A_{n-L-2)}, \ldots, A_n)$ vectors, for n=0, 1, . . . , N+L−2. These conditional probabilities may be calculated precisely using the BAHL algorithm, also known as the BCJR algorithm [6]. They may also be calculated approximately and easily using linearized variants of the BAHL algorithm [10].

Figure 11:
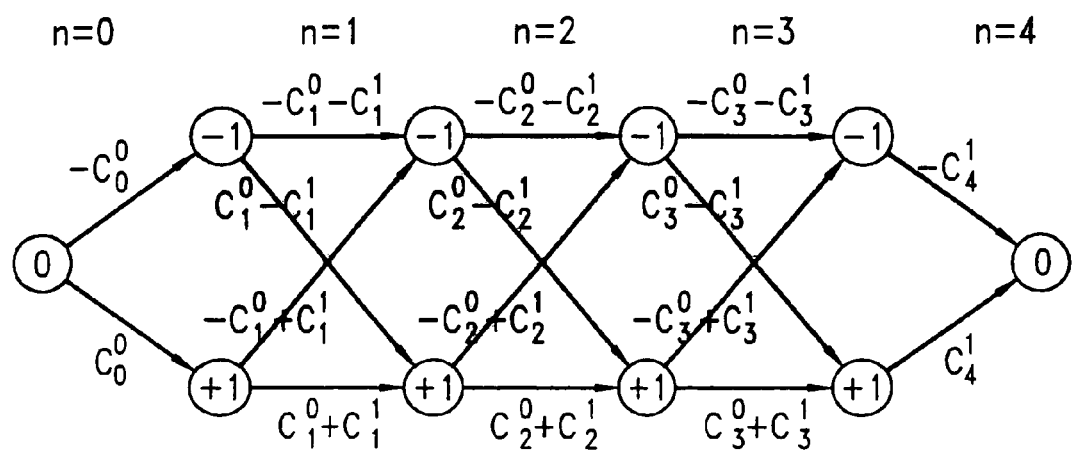
FIG. 11 illustrates a representation of the mesh of the normalized discrete channel seen at the output from the whitener filter for a channel with two paths and a modulation with two states and a length of the timeslot equal to four.

For example, the following describes an outline of the calculation of the conditional probabilities $P(A_n|R_0\{G^{m(d+1)}\}_{m=0}^{.1-1.}\{G^{m(d)}\}_{m=1}^{L-1})$ using the BAHL algorithm. Note that according to FIG. 8, the sample $R_n$ obtained at instant n depends on the symbol $A_n$ transmitted at this instant and the L−1 symbols $A_{n-1}, A_{n-2}, \ldots, A_{n-(L-1)}$ preceding it. Thus, the modulator—multi-path channel—demodulator assembly may be modeled using a MARKOV discrete time sequence. This MARKOV sequence is described by a mesh, in which the states represent the contents of the offset register in FIG. 8 at each instant n and in which the labels of the branches represent the non-noisy version of possible samples at the output from the whitener filter. For example, FIG. 11 shows a mesh view of a discrete channel composed of L=2 paths for a modulation MDP2 with two states {−1, +1} and a length of the timeslot N=4.

This type of mesh represents the expected output from the channel as a function of time and depending on the transmitted symbols. In the case shown in which it is assumed that the channel has two paths, the channel output depends on the symbol transmitted at the instant considered and at the previous instant. For example, starting from instant n=1, it is possible to transmit either −1 or +1, knowing that nothing was transmitted at the previous instant 0 (initial node at the left end). If −1 was transmitted, then it would be expected that $(-1)C_0^0 + (0)C_0^1$, namely $C_0^0$, would be received at the output from the channel, which is the quantity that appears on the first up branch towards the −1 node. If +1 was transmitted, it would be expected to receive $(+1)C_0^0 + 0C_0^1$, namely $C_0^0$, which is the quantity that appears on the first down branch towards the +1 node.

For n=1, if −1 was transmitted and if −1 had been transmitted at the previous instant n=0, then it would be expected that $(-1)C_1^0 + (-1)C_1^1$, namely $-C_1^1 - C_1^1$ would be received. If +1 was transmitted, it would be expected that $(+1)C_1^0 - C_1^1 = C_1^0 - C_1^1$ would be received. Similarly, if +1 had been transmitted at the previous instant, it would be expected that $-C_1^0 + C_1^1$ would be received if −1 had been transmitted, or that $C_1^0 + C_1^1$ would be received if +1 had been transmitted. These four values appear on the four branches at n=1. The timeslot is completed by sending 0, and the expected quantity is $-C_4^1$ or $C_4^1$ depending on whether −1 or +1 was transmitted at the previous instant n=3. Therefore the mesh actually represents the quantities expected at the channel output at each instant, as a function of the symbols transmitted.

In accordance with this representation of the discrete channel, each branch of the mesh determines a unique value of the vector $A_n=(A_{n-(L-1)}, A_{n-(L-2)}, \ldots, A_n)$, since firstly the first L−1 components are given by the initial state $S_n(A_{n-(L-1)}, A_{n-(L-2)}, \ldots, A_{n-1})$ of the branch, and secondly the last L−1 components are given by the final state $S_{n-1}$ $(A_{n-(L-2)}, A_{n-(L-3)}, \ldots, A_n)$. The problem of calculating conditional a posteriori probabilities $P(A_n|R_0\{G^{m(d+1)}\}_{m=0}^{l-1} \cdot \{G^{m(d)}\}_{m=1}^{L-1})$ is therefore reduced to a calculation of the probabilities of the branches of the mesh depending on the received samples vector R and the intermediate estimate of the normalized discrete channel given by the vectors $C^{m(d-1)}$ for the first 1 paths m=0, 1, ..., l=1 and the vectors $C^{m(d)}$ for the last L−1 paths m=l, l+1, ..., L−1. Consequently, the branches of the mesh must be labeled by the coefficients of this intermediate estimate and not by the coefficients of the real discrete channel.

The BAHL algorithm can be used to efficiently calculate conditional a posteriori probabilities of the branches of the mesh by factoring the expression of the probability of the received vector R, depending on each of the sequences A that may be transmitted, in order to avoid duplicating all operations common to transmitted sequences with the same past or the same future at a given instant. Consequently, this algorithm uses the $\alpha_n(S)$ and $\beta_n(S)$ functions that give a preview of the past and the future respectively for each instant n=0, 1, ..., N+L−1, and each possible value S of the state $S_n$.

The function $\alpha_n(S)$ is the joint probability of being in state $S_n=S$ at instant n and having received the samples $\{R_l\}_{l=0}^{n-1}$. This function is calculated by factorization of the calculations for sequences with a common past using the recurrence:

$$\alpha_n(S) = \sum_{S'} \alpha_{n-1}(S')\gamma_n(S', S)$$

where $\gamma_n(S', S)$ is the function that gives the probability, depending on an initial state of the mesh $S_{n-1}=S'$, of changing from state $S_n=S$ and receiving the sample $R_{n-1}$ at the same time. This expression shows that information about the past may be acquired either through probabilities associated with the instant immediately preceding the current instant or through the probabilities of transitions of the mesh branches.

The significance of the $\beta_n(S)$ function is similar to the significance of the $\alpha_n(S)$ function. It is the probability of having received the samples $\{R_k\}_{k=n}^{n+L-2}$ depending on the initial state $S_n=S$ at instant n. This function may also be calculated by successive approximations starting from the future by the recurrence $$\beta_n(S) = \sum_{S'} \beta_{n+1}(S')\gamma_{n+1}\lfloor(S', S)\rfloor$$

Here again, this recurrence proves that knowledge of the future for a state $S_n=S$ may be obtained starting from the characteristics of the states $S_{n+1}=S'$ immediately following this state and the branches of the mesh joining them together. For a branch of the mesh characterized by the initial state $S_n=S'=(A_{n-(L-1)}, A_{n-(L-2)}, \ldots, A_{n-1})$ and the final state $S_{n-1}=S=(A_{n-(L-1)}, \ldots, A_{n-1}, A_n)$, the $\gamma_k(S', S)$ function is given by:

$$\gamma_{n+1}(S', S) = P(A_n)\frac{1}{\pi N_0}\exp\left(-\frac{1}{N_0}\left|R_n - \sum_{m=0}^{l-1} C_n^{m(d-1)}A_{n-m} - \sum_{m=1}^{L-1} C_n^{m(d)}A_{n-m}\right|^2\right),$$

where $P(A_n)$ is the a priori probability of sending the symbol $A_n$. These a priori probabilities may characterize a possible coding of the actually transmitted modulated symbols. They may also characterize the reference symbols that are known to the receiver and that have only one possible value. For these reference symbols, the a priori probability $P(A_n)$ is equal to 1 for the value actually transmitted and 0 for other possible values of the modulation.

The following initial values have to be used so that recurrences can be made on the $\alpha_n(S)$ and $\beta_n(S)$ functions: $\alpha_0(S0=(0,0,\ldots,0))=1$ and $\beta_{n-L-1}=(S_{N-L-}=(0,0,\ldots,0))=1$ Starting from a calculation of the $\alpha_n(S)$ and $\beta_n(S)$ functions using the BAHL algorithm, it is easy to obtain the probabilities for branches of the mesh, depending on the received samples and the intermediate estimate of the discrete channel using the formula:

$$P\left(A_n = A \mid R, \{G^{m(d+1)}\}_{m=0^*}^{l-1} \{G^{m(d)}\}_{m=1}^{L-1}\right) = \frac{\alpha_n(S')\gamma_{n+1}(S', S)\beta_{n+1}(S)}{\beta_0(S_0 = (0, 0, \ldots, 0))}$$

where $A_n=(A_{n-(L-1)}, A_{n-(L-2)}, \ldots, A_n)$, $S'=(A_{n-(L-1)}, A_{n-(L-2)}, \ldots, A_{n-1})$ and $S==(A_{n-(L-1)}, \ldots, A_{n-1}, A_n)$.

However, note that the BAHL algorithm is fairly complex and that in practice it is better to use approximate algorithms that can significantly reduce the complexity of the calculations without excessively reducing performances. The use of these approximate algorithms is recommended particularly when the number of paths and/or modulation states is high.

After D iterations, the receiver has an estimate of the direct channel $\{C^{1(D)}\}_{l=0}^{L-1}$ close to optimum value depending on the maximum a posteriori criterion that is normally obtained after an infinite number of iterations. Starting from this channel estimate and samples received during the timeslot to be processed, the receiver may output either firm decisions using the VITERBI algorithm, or weighted decisions using the SOVA algorithm or the BAHL algorithm.

The VITERBI algorithm searches for the most probable transmitted sequence. Therefore, it can reduce the probability of decision errors on these transmitted sequences. The SOVA algorithm is a VITERBI algorithm with weighted outputs. It enables a more precise characterization of the reliability of decisions made with the VITERBI algorithm. The BAHL algorithm can determine the a posteriori probability density for each transmitted symbol, depending on the received samples and the obtained channel estimate. Therefore, it can determine the most probable value of each transmitted symbol and therefore reduce the error rate. Weighted outputs are obtained through symbol probabilities depending on received samples.

In all cases, weighted outputs are only useful if corrector decoding or source coding with weighed inputs is used in order to increase the receiver performances.

For example, within the framework of the BAHL algorithm, the receiver uses the $\{C^{l(D)}\}_{l=0}^{L-1}$ estimate of the discrete channel to calculate the $\alpha_n(S)$ and $\beta_n(S)$ functions. These functions can then be used to determine the probability distribution for each symbol $A_n$ using the formula:

$$P(A_n = A \mid R_* \{G^{l(D)}\}_{l=0}^{L-1}) = \sum_{\substack{A \\ \lambda-A}} P(A_n = A \mid R_* \{G^{l(D)}\}_{l=0}^{L-1})$$

All the operations for iterative estimation of the discrete channel and detection operations described above are shown in FIG. 12. The channel estimator 120 uses means defining the $\{B^{1k}\}_{k=0}^{N-1}$ bases, l=0, 1, L−1, and means 122 calculating the weighting coefficients $\{W'_k{}^1\}_{k=0}^{N-1}$ and $\{W_k{}^1\}_{k=0}^{N-1}$. The estimator 120 uses a first coarse estimate of the channel starting from the elementary reference sequences alone by circular correlation with the corresponding CAZAK sequences. This first estimate is symbolized by the block $\mathfrak{J}_0$ reference 1201 that outputs the appropriate representation of the initial estimate $\{G^{1(D)}\}_{l=0}^{L-1}$. The estimator 120 then uses an order d re-estimate, represented by block $\mathfrak{J}d$ reference 1202 that outputs the appropriate representation of the channel estimate $\{G^{1(D)}\}_{l=0}^{L-1}$ followed by an order d+1 re-estimate represented by block $\mathfrak{J}_{d-1}$ reference 1203 that outputs the representation of the channel estimate $\{G^{1(d-1)}\}_{l=0}^{L-1}$. Finally, the estimator 120 uses a final order D re-estimate represented by block $\mathfrak{J}_D$ reference 1204 that outputs the appropriate representation of the channel estimate $\{G^{1(D)}\}_{l=0}^{L-1}$. The estimator uses this appropriate representation of the estimated channel to output the final estimate $\{C^{1(D)}\}_{l=0}^{L-1}$ of the discrete channel using means 1205, and using the KARHUNEN-LOEVE transformation.

Firm or soft decisions on the transmitted symbols are supplied to an error corrector decoder or a source decoder by means 123 that may use the VITERBI algorithm [3], the SOVA algorithm [2], the BAHL algorithm [6] or the linearized BAHL algorithm [10].

Figure 13:
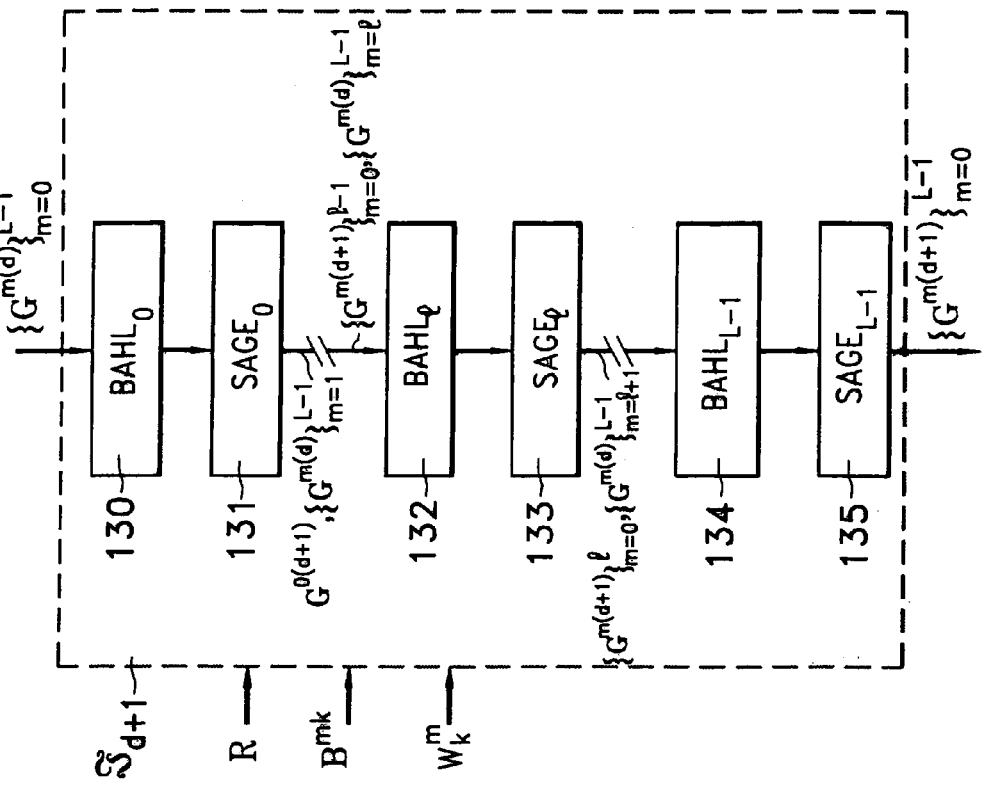
FIG. 13 shows the chronology of processing done in an elementary iteration of the channel estimating algorithm.

According to the invention, the iterative re-estimate of the channel is made D+1 times and is used to calculate $\{G^{1(0)}\}_{l=0}^{L-1}, \{G^{1(1)}\}_{l=0}^{L-1}, \ldots, \{G^{1(D)}\}_{l=0}^{L-1}$ successively. FIG. 13 illustrates the L steps making up each iteration and that are necessary for successive estimate of each of the L paths. The $(d+1)^{th}$ iteration $\mathfrak{J}_{d+1}$ of the channel estimator uses the means 121 and 122 shown in FIG. 12 (providing bases $\{B^{mk}\}_{k=0}^{N-1}$ and weighting factors $\{w_k^m\}_{k=0}^{N-1}$), carries out a first step based on the BAHL algorithm and represented by the BAHL$_0$ block reference 130, to produce conditional a posteriori probabilities $P(A_n|R_*\{G^{m(d)}\}_{m=0}^{1-1})$ starting from the $d^{th}$ re-estimate of the channel. Starting from these conditional probabilities, the $(d+1)^{th}$ iteration then executes a second step, based on the SAGE algorithm and represented by the SAGE$_0$ block reference 131 to enable the $(d+1)^{th}$ re-estimate $G^{0(d=1)}$ of the first path.

Starting from the $(d+1)^{th}$ re-estimate of the 1−1 first paths, the $(d+1)^{th}$ iteration executes a third step, once again based on the BAHL algorithm and represented by the BAHL block, reference 132 to produce conditional a posteriori probabilities $P(A_n|R_*\{G^{m(d)}\}_{m=0}^{L-1}, \{G^{m(d)}\}_{m=1}^{L-1})$ starting from the $d^{th}$ re-estimate of the L−1 last paths of the channel and the $(d+1)^{th}$ re-estimate of the first 1 paths of this channel. Subsequently, the $(d+1)^{th}$ iteration executes a fourth step based on the SAGE algorithm and shown by the SAGE$_1$ block reference 133, to enable the $(d+1)^{th}$ re-estimate $G^{1(d+1)}$ of the $1^{th}$ path.

Finally, starting from the $(d+1)^{th}$ re-estimate of the first L−1 paths, the $(d+1)^{th}$ iteration executes a final step based on the BAHL algorithm and represented by the BAHL$_{l-1}$ block reference 134, to output conditional a posteriori probabilities $P(A_n|R_*\{G^{m(d+1)}\}_{m=0}^{L-1}, \{G^{(L-1),(d)}\})$ starting from the $d^{th}$ re-estimate of the last channel path and the $(d+1)^{th}$ re-estimate of the first L−1 paths of this channel. The $(d+1)^{th}$ iteration then executes a final step, based on the SAGE algorithm and represented by the SAGE$_{L-1}$ block reference 135, to make the $(d+1)^{th}$ re-estimate $G^{(L-1),(d-1)}$ of the $L^{th}$ path.

Figure 12:
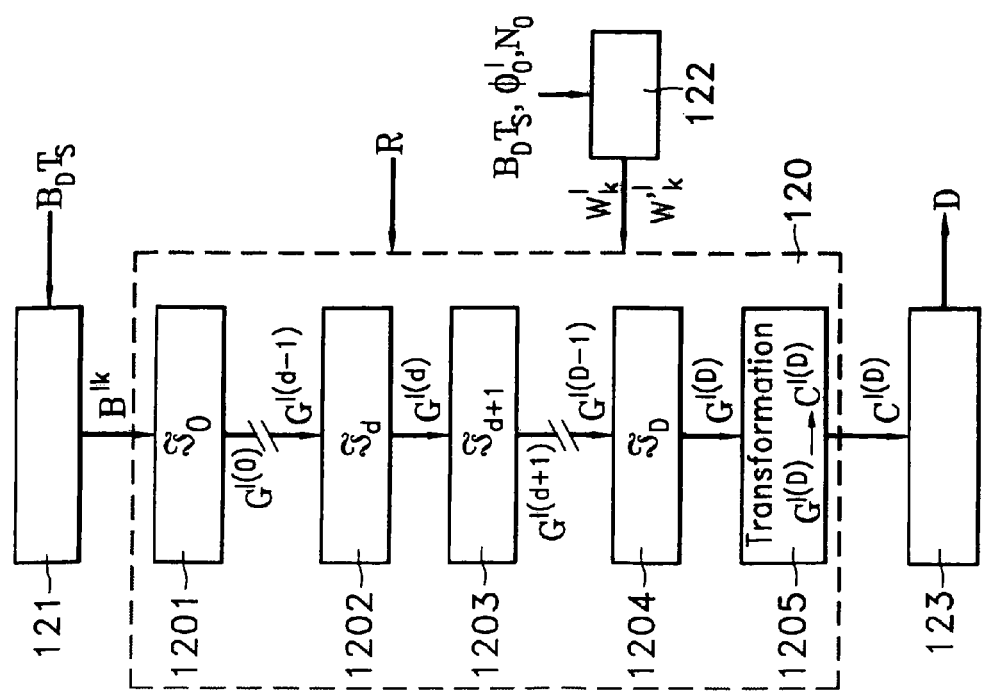
FIG. 12 shows the chronology of processing done on reception for a received timeslot.

The first iteration symbolized by block $\mathfrak{J}_0$ reference 1201 in FIG. 12, cannot use the BAHL and SAGE algorithms to calculate the first estimate of the discrete channel. According to the invention, the reference symbols for which a priori and a posteriori probabilities are well known to the receiver are used to make this first estimate. This first estimate is made by correlating the received samples depending solely on these reference symbols, with the corresponding CAZAC sequences. It uses means 122 in FIG. 12 to calculate the weightings $\{W'_k{}^1\}_{k=0}^{N-1}$.

REFERENCES

[1] M. MOULY and M.-B. PAUTET, "The GSM System for Mobile Communications" Europe Media Duplication S.A., 1993.

[2] J. HAGENAUER and P. HOEHER, "A Viterbi Algorithm with Soft-Decision Outputs and its Applications", GLOBECOM '89.

[3] J. G. PROAKIS, "Digital Communications", McGraw-Hill, 1989.

[4] U. H. ROHRS and L. P. LINDE, "Some Unique Properties and Applications of Perfect Squares Minimum Phase CAZAC Sequences", IEEE COMSIG '92, Proceedings of the 1992 South African Symposium on Communications and Signal Processing.

[5] A. MILEWSKI, "Periodic Sequences with Optimal Properties for Channel Estimation and Fast Start-up Equalization", IBM Journal of Research and Development, vol. 27, No. 5, September 1983.

[6] L. R. BAHL, J. COKE, F. JELINEK and J. RAVIV, "Optimal Decoding of Linear Codes for Minimizing Symbol Error Rate", IEEE Transactions on Information Theory, March 1974.

[7] J. A. FESSLER and A. O. HERO, "Space-Alternating Generalized Expectation-Maximization Algorithm", IEEE Transactions on Signal Processing, vol. 42, No. 10, October 1994.

[8] G. KAWAS-KALEH, "Joint Carrier Phase Estimation and Symbols Decoding of Trellis Codes", ENST Paris, March 1991.

[9] A. P. DEMPSTER, N. M. LAIRD and D. B. RUBIN, "Maximization Likelihood from Incomplete Data via the EM Algorithm", Journal of the Royal Statistical Society, Ser. 39, 1977.

[10] P. TORTELIER, "Decoding processes with weighted outputs using the Viterbi algorithm in operation by blocks", French patent No. 9509610, Aug. 8, 1995.

[11] X. LAGRANGE, P. GODLEWSKY and S. TABBANE, "GSM-DCS networks: from principles to standard", Hermes 1997.

[12] S. A. TEUKOLSKY, W. T. VETTERLING, and B. P. FLANNERY, "Numerical recipes in C: the art of scientific computing", W.H. Press, New-York, 1992.

[13] FR-A-2 747 870.

What is claimed is:

1. Process for radiomobile communication of the time division multiple access type, in which timeslots are allocated to several users for transmission and reception of radioelectric signals, and in which:

on transmission, data symbols and reference symbols are created in each allocated timeslot, a radioelectric signal containing these data symbols and reference symbols is transmitted, this signal being sent along a multi-path radiomobile channel, on reception, matched filtering is applied to the received signal, the filtered signal is sampled at the rate of the symbols, an estimate of the radiomobile channel is made, the samples are processed using this channel estimate and data symbols specific to the allocated timeslot are restored, this process being characterized in that:

on transmission, several reference sequences possessing appropriate time correlation properties are built up for each allocated timeslot, and these sequences are distributed in each timeslot, on reception:

i) in order to estimate the radiomobile channel, this channel is represented by a mesh comprising branches symbolizing transitions between two successive states of the channel and characterizing possible sequences at the channel output, ii) the probabilities of these branches are calculated using an iterative algorithm in which an estimate of a representation $\{G^{1(D)}\}_{l=0}^{L-1}$ of L paths of this channel is calculated using a finite number (D+1) of iterations using the maximum a posteriori probability criterion, the iteration rank (d+1) (3d+1) being used to obtain a re-estimate $\{G^{1(d+1)}\}_{l=0}^{L-1}$ starting from the estimate $\{G^{1(d)}\}_{l=0}^{L-1}$ obtained in the previous iteration (3d), and in each iteration (3d+1), the vectors $\{G^{1(d+1)}\}$ l=0, 1, ..., L−1 are calculated in L steps from vectors $\{G^{m(d+1)}\}_{m=0}^{1-1}$ and $\{G^{m(d)}\}_{m=1}^{L-1}$ calculated in the previous step, the estimate $\{C^{1(D)}\}_{l=0}^{L-1}$ of L channel paths finally being obtained from the estimate of its representation $\{G^{1(D)}\}_{l=0}^{L-1}$.

2. Process according to claim 1, in which the following are used in sequence in each step of each iteration:

i) a BAHL algorithm or one of its variants to produce conditional probabilities starting from the $d^{th}$ re-estimate of the last L−1 paths and the (d+1)$^{th}$ re-estimate of the first l paths, ii) a SAGE algorithm to output a (d+1)$^{th}$ re-estimate of the $l^{th}$ path.

3. Process according to claim 1 in which, after having obtained an estimate of the discrete channel $\{C^{1(D)}\}_{l=0}^{L-1}$ and taking account of samples received during the processed timeslot, a decision is made about the sequence of transmitted symbols using a BAHL optimal algorithm or one of its variants to obtain the a posteriori probability for each transmitted symbol.

4. Process according to claim 1, in which K reference sequences are distributed in each allocated timeslot, where K is between 2 and 12 inclusive.

5. Process according to claim 1, in which each sequence comprises a number of reference symbols less than 8.

6. Process according to any one of claims 1 to 5, in which the reference sequences have a zero circular autocorrelation function everywhere except at the origin.

7. Process according to claim 6, in which a reference sequence {−1, +1, +1, +1} (or a sequence derived from this reference sequence by circular swapping) is used, or a sign change for a number of paths (L) less than or equal to 4.

8. Process according to claim 6, in which a reference sequence {1,i}, or a sequence derived from this reference sequence is used by circular swapping, conjugation or sign change, is used for a number of paths (L) less than or equal to 2.

* * * * *